United States Patent
Rieger

(10) Patent No.: US 8,260,812 B2
(45) Date of Patent: Sep. 4, 2012

(54) SYSTEM MANAGEMENT BY COMPONENT USAGE SWITCHES

(75) Inventor: Lothar Rieger, Bammental (DE)

(73) Assignee: SAP AG, Walldorf (DE)

( * ) Notice: Subject to any disclaimer, the term of this patent is extended or adjusted under 35 U.S.C. 154(b) by 467 days.

(21) Appl. No.: 12/492,191

(22) Filed: Jun. 26, 2009

(65) Prior Publication Data
US 2010/0332566 A1 Dec. 30, 2010

(51) Int. Cl.
*G06F 7/00* (2006.01)
*G06F 17/00* (2006.01)
(52) U.S. Cl. .................. 707/781; 707/999.009; 707/666
(58) Field of Classification Search .................. 707/781, 707/600, 999.009; 1/1
See application file for complete search history.

(56) References Cited

U.S. PATENT DOCUMENTS

| 7,657,545 | B2 * | 2/2010 | Bird ............................. 705/7.37 |
| 2004/0103046 | A1 * | 5/2004 | Christoph et al. .............. 705/28 |
| 2007/0016557 | A1 * | 1/2007 | Moore et al. ..................... 707/3 |

* cited by examiner

*Primary Examiner* — Paul Kim
(74) *Attorney, Agent, or Firm* — Kenyon & Kenyon LLP

(57) ABSTRACT

Systems and methods for managing multiple systems in an enterprise resource planning system are provided. In an embodiment, data identifying modules and entities using modules or systems may be collected from each system in enterprise resource planning system. The collected data may then be organized to show a usage landscape of entire enterprise resource planning system. In an embodiment, the collected data may also be merged with other organizational data, such as organizational chart data, to present the usage landscape in an intuitive manner using the organizational structure data from the organizational chart. The collected data may also be used to identify potential data inconsistencies across different systems or may be used to limit connectivity to only authorized systems or modules. In some embodiments, attributes such as attributes identifying modules and entities may be inputted into a system which then distributes the attributes to other systems.

17 Claims, 7 Drawing Sheets

SYSTEM MANAGEMENT BY COMPONENT USAGE SWITCHES

BACKGROUND

Many large businesses rely on enterprise resource planning computing architectures and systems to electronically manage and coordinate business resources, information, and functions. In large organizations these computing architectures may be made up of hundreds of systems, distributed across various entities making up the organization. For example, a global business may rely on location-specific logistics systems to process orders in different localities, division specific supply chain management systems to manage supply chains across geographies, and business specific accounting systems to manage financial transactions at a business level.

Moreover, while each system in the enterprise resource planning computing architecture may have several modules or components active, not all of the modules or component in each system may used. For example, a global corporation's subsidiary in Canada may only use a logistics module on one of its enterprise resource planning systems, even though the system contains other several dozen other installed and operational modules, such as a finance and a human resources module. The same corporation's subsidiary in Germany may use a different logistics module on a second system and also use a finance module on a third system, even though the second and third systems may contain active logistics and finance modules, along with several dozen other modules.

While each of these systems may be administered by a local administrator, the local administrator may only have authority to manage users of the local system. For example, while the local Canadian administrator may manage users of the Canadian system, the Canadian administrator may not know about the German or French systems or users of German or French system other than those German or French users who require access to the components of the Canadian system.

As the size, number of entities, and number of enterprise resource planning systems of an organization increases, the complexity of the enterprise resource planning computing architecture also increases and becomes difficult to manage. Administrators, such as the Canadian system administrator, might not even be aware of the existence of many other enterprise resource planning systems and users of these other systems in the organization, and thus may not be able to assess security vulnerabilities posed by these other unknown systems and users.

For example, FIG. 1 shows an exemplary enterprise resource planning computing system including two enterprise resource planning (ERP) systems 80 and 90. Each of the systems contain at least three modules: finance module 81, logistics module 82, and human resources module 83 in system 80, and finance module 91, logistics module 92, and human resources module 93 in system 90. Each system 80 and 90 also contains its own access control and security settings. System 80, for example, may be part of a Canadian subsidiary's computing systems administered by Canadian administrators, while system 90 may be part of a German subsidiary's computing systems administered by administrators in Germany.

Administrators in Canada may only authorize user 10A to access logistics module 82, while administrators in Germany may authorize user 10B to access finances module 91. In this example, the organization does not use logistics module 92 in system 90 and human resources modules 83 and 93 in systems 80 and 90 respectively, as indicated by the "X" associated with the respective modules. Since user 10A has no need or authorization to access modules in system 90, while user 10B has no need or authorization to access modules in system 80, administrators in system 80 may not necessarily know of the functionality or even existence of system 90 or user 10B and administrators in system 90 may not necessarily know of the functionality or even existence of system 80 or user 10A.

Even though the users 10A and B only have limited access to a subset of modules each of their systems 80 and 90, respectively, the users 10A and B, may nonetheless attempt to connect to modules in another systems, as shown by the lines connecting user 10A to logistics module 92 and user 10B to human resources module 83. Although users 10A and B may fail in an attempt to connect to modules in systems that they do not have access to, in some instances, the users 10A and B, may be able to access unused modules, such as logistics module 92 and human resources modules 83 and 93.

Although the exemplary systems shown in FIG. 1 contains only three modules, in different instances each enterprise resource planning system may have several dozen or more modules installed and active, even through the organization may only use a handful of these active modules. If an organization has several dozen of these systems, then there could easy be several hundred unused modules in the organization.

Unauthorized access to these unused modules may present risks to organization, if, for example, the organization plans to use the modules in the future. The problem is further compounded when local system administrators may not even be aware of the functionality or existence of different enterprise resource planning systems in the organization to limit local system vulnerabilities.

Furthermore, when there are many different systems, it also becomes increasing complicated for the organization to keep track of which users and entities are using which modules and systems. The decentralized structure of enterprise resource planning systems within an organization, such as, for example administrators in Germany managing German systems, while Canadian administrators manage Canadian systems, makes it difficult to collect, organize, and manage information from each of these systems in a cohesive and intuitive form.

Thus, there is a need to prevent unknown entities within an organization from accessing unauthorized modules and systems. There is also a need to efficiently collect and manage usage data from a plurality of decentralized enterprise resource planning systems.

DETAILED DESCRIPTION

An embodiment of the invention may include a data collection system that identifies and collects usage data from each enterprise resource planning system in an organization and an access control system that prevents users from accessing unauthorized components in different systems. Another embodiment may include an access control system storing attributes that may be sent to different systems, such a new or reconfigured systems joining the overall enterprise resource planning system, in order to set attributes in these systems and/or prevent users from accessing unauthorized components in the different systems.

In an embodiment, the data collection system may record the modules in each system being used by the organization, the business entities using each module, and attributes associated with the business entities using each module. Once the information is collected from each system, the information may be used by the organization to manage the overall enterprise resource planning system. For example, in an embodiment, the information may be used to generate reports or may be used by the access control system to limit a user's view of enterprise systems in the organization to only those systems and modules that the user is permitted to access. In another embodiment, the information may be compared to other data, such as data obtained from an organizational chart, to present the collected information in a more intuitive form, such as by restructuring the information based on the organizational chart data.

In an embodiment, the data collection system may record the modules in each system being used by the organization, the business entities using each module, and attributes associated with the business entities using each module. Once the information is collected from each system, the information may be used by the organization to manage the overall enterprise resource planning system.

Figure 1:
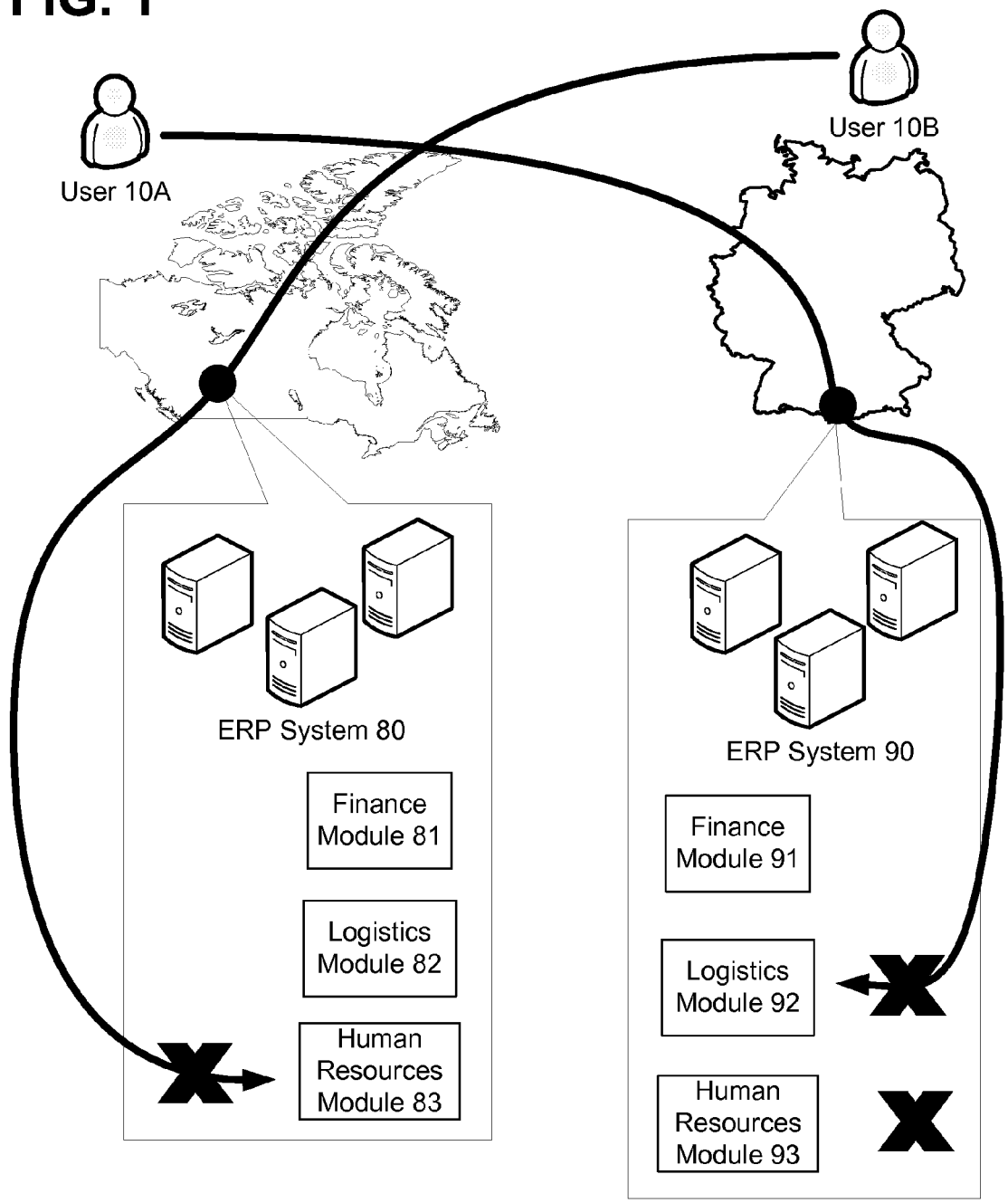
FIG. 1 shows an exemplary enterprise resource planning system.
Figure 2:
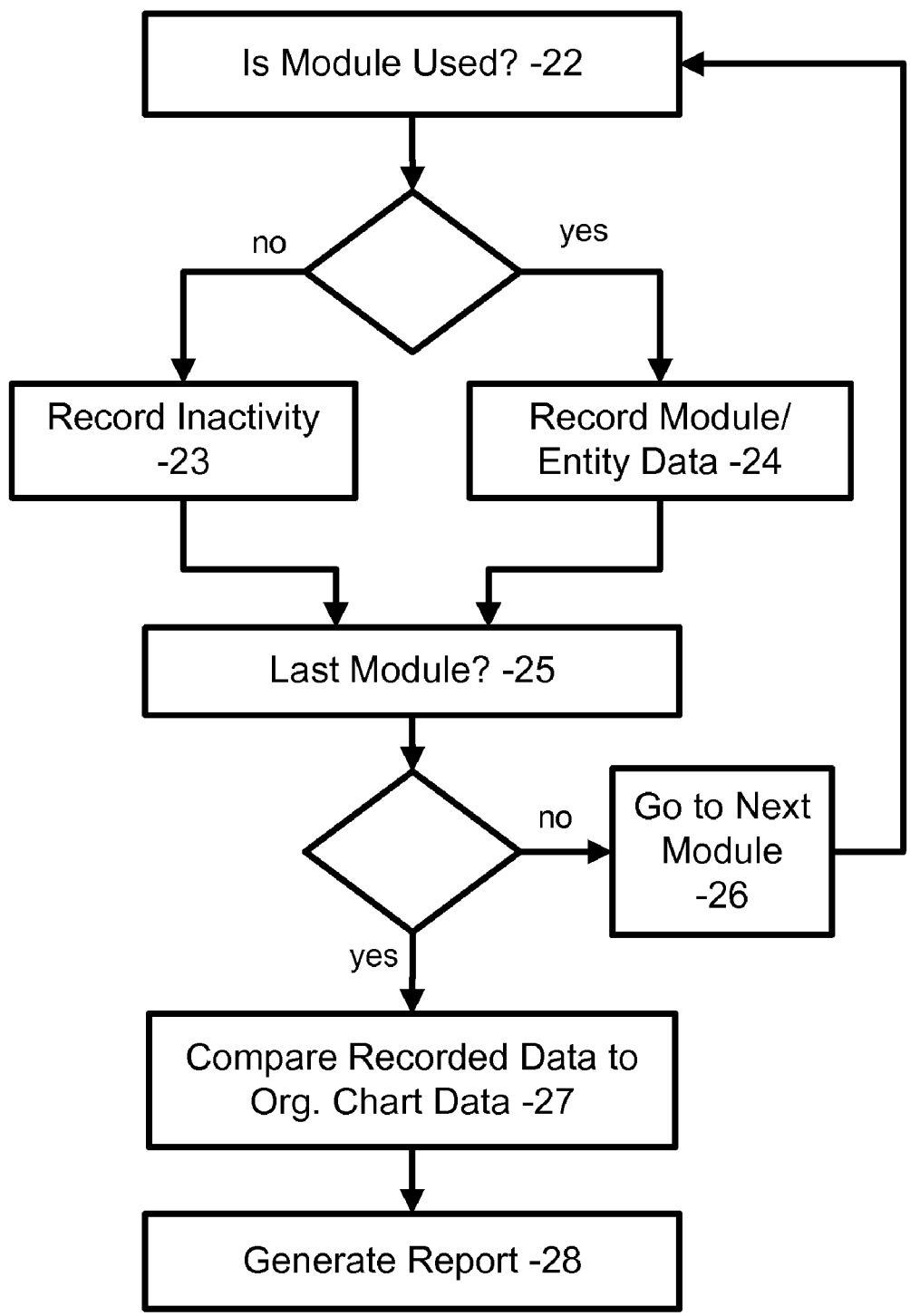
FIG. 2 shows a method of identifying and collecting usage data from enterprise resource planning systems in an embodiment of the invention.

An embodiment shown in FIG. 2, for example, shows a method of identifying and collecting module use data from enterprise resource planning systems. In step 22, a module in an enterprise resource planning system is checked to see if it is used by the resource planning system.

If the module is not used, the inactive status of the module may be recorded in step 23 and the process may continue to step 25. If the module is used, additional data about the use of the module may be recorded in step 24 and the process may continue to step 25. For example, data identifying the entities using the module, attributes of the entities using the module, and/or the elements of the module used by the entity may be recorded.

In step 25, the modules in the resource planning system may check whether the module being processed is the last module to be processed. If there are other modules in the system that have not been processed, the next unprocessed module may be selected in step 26, and the process may repeat itself using the module selected in step 26.

Once all the modules in the resource planning system have been processed, the recorded data obtained from the modules may be compared to other organizational data, such as an organizational chart, in step 27.

The results of the comparison may then be used to generate a report or restrict access to specific modules in step 28. In an embodiment, the access control system may use the results of the comparison to prevent users from accessing systems or modules that they are not permitted to access.

Figure 3:
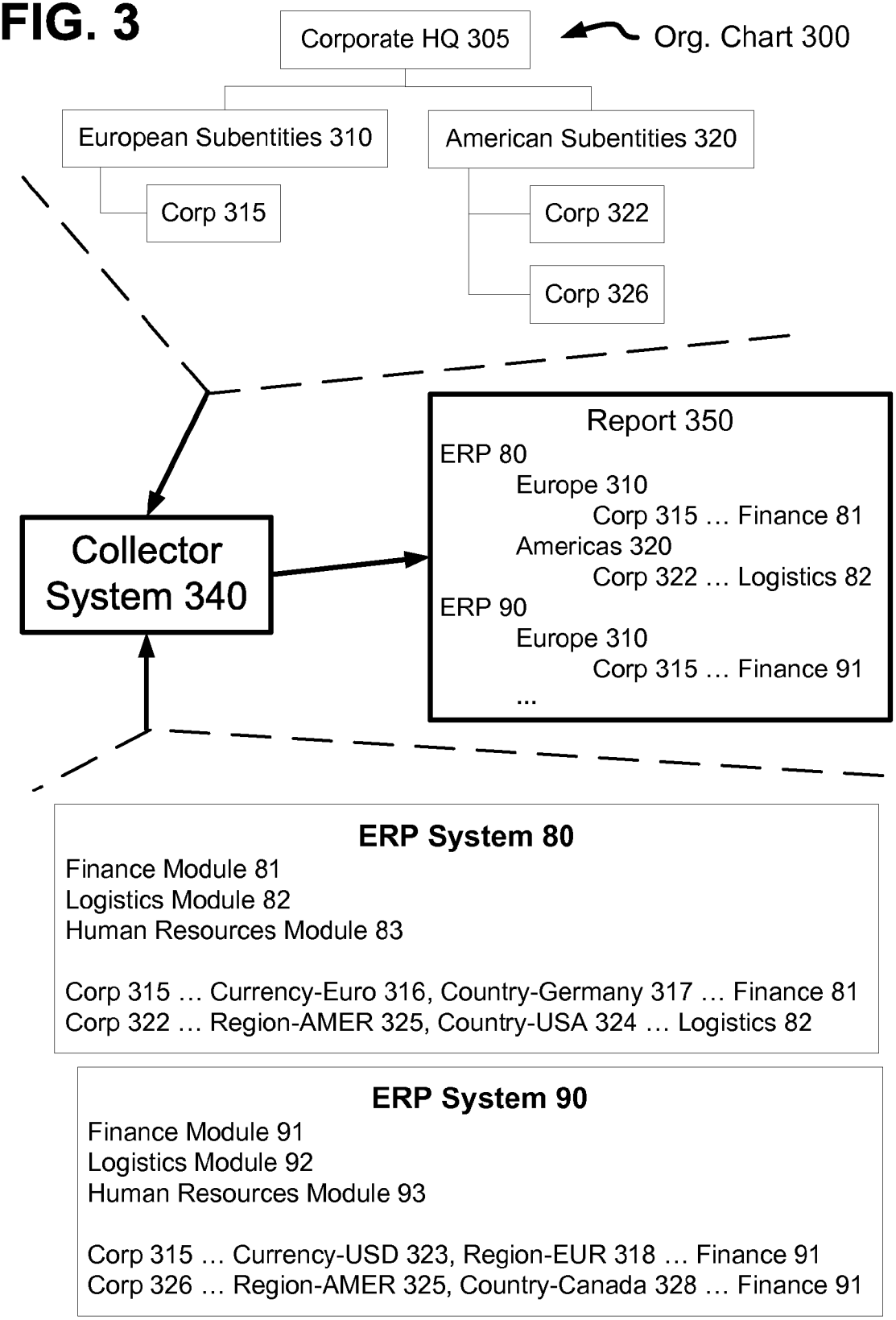
FIG. 3 shows a collector system generating a report after comparing organizational data to module usage data in an embodiment.

FIG. 3 shows a collector system 340 comparing organizational data from organizational chart 300 and module use data obtained from resource planning systems 80 and 90 to generate report 350 in an embodiment. The top half of FIG. 3 shows organizational chart 300, which may contain a principal corporate headquarters entity 305 made up of subordinate European 310 and American 320 subentities. Each of these subentities may be made up of one or more subordinate corporations 315, 322, 326. While the organizational chart 300 in this embodiment is subdivided according to geographical regions and corporate entities, organizational charts in other embodiments may be organized differently. For example, instead of structuring the organization's data by corporate entities and geographic regions, other organizational charts may structure data according to product lines, business functions, or supply chains.

The bottom portion of FIG. 3 shows module use data obtained from enterprise resource planning systems 80 and 90 by collector system 340 in an embodiment. During the data collection process, an example of which is shown in FIG. 2, collector system 340 may acquire data that system 80 has three modules, finance 81, logistics 82, and human resources 83. Collector system 340 may also acquire data that corporation 315 uses finance module 81, corporation 322 uses logistics module 82, and human resources module 83 is not used.

Collector system 340 may also acquire data from system 90 that system 90 also has three modules, finance 91, logistics 92, and human resources 93. Collector system 340 may also acquire data that corporation 326 uses finance module 91, while logistics module 92 and human resources module 93 are not used. In other embodiments, collector system 340 may also acquire attribute data from enterprise resource planning systems 80 and 90. Attribute data is any data describing an attribute of an entity. Examples of attribute data include that corporation 315 using finance module 81 has currency in Euros 316, and has base country Germany 317, while corporation 322 using logistics module 82 has base country USA 324 and region AMER 325, and so on.

Once collector system 340 acquires module use data from enterprise resource planning systems 80 and 90 and organizational data from organizational chart 300, the collector system 340 may compare the data to generate a report 350 that integrates the module use data and the organizational data. This may be done by identifying fields in common between the module use data and the organizational data and then linking the two fields. For example, organizational chart 300 and systems 80 and 90 all contain fields identifying the different corporations 315, 322, and 326, and data from the two sources may be linked based on the corporation field. The sources may be linked in other embodiments indirectly, through lookup tables, queries, logical expressions, or formulas.

Once the two sources have been linked, the data be integrated and reports can be generated. Report 350 is an example of an enterprise resource planning system management report that is generated from the integrated data. This report breaks down for each resource planning system 80 and 90, the subentities that use the system, such as Europe 310 and Americas 320, as well as the corporations 315, 322, and 326 that use the system and the modules 81, 82, and 91 used by the corporations 315, 322, and 326. Reports, such as report 350, can be used to provide an overview of the distribution of an organization's enterprise resource planning systems at an organizational level.

Figure 4:
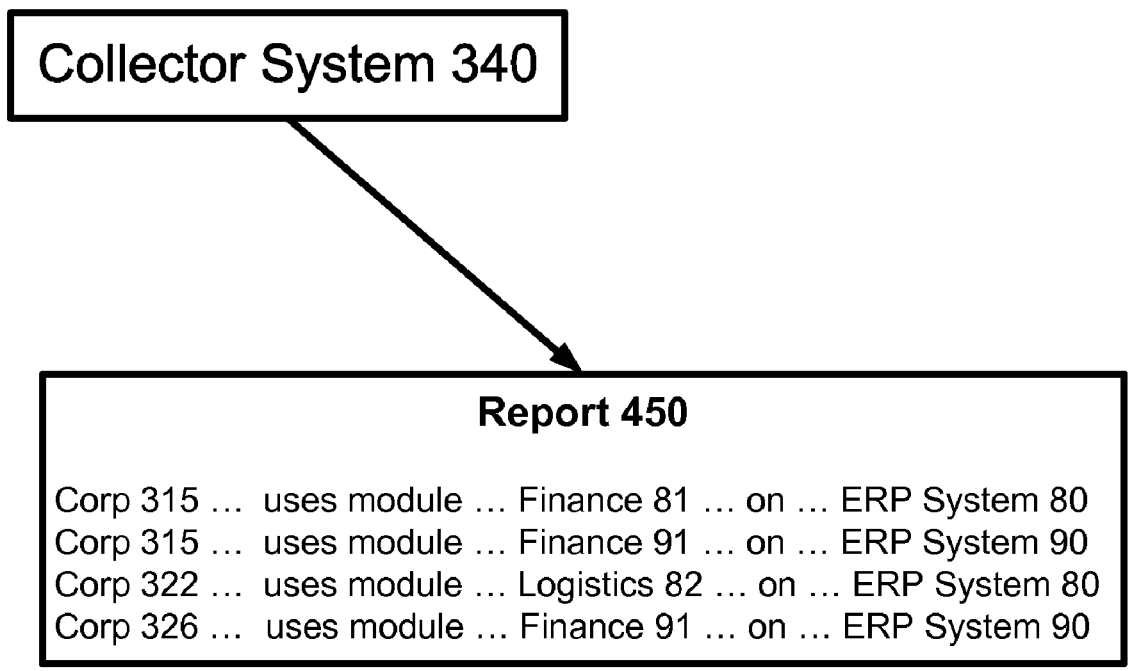
FIG. 4 shows a first exemplary report generated by the collection system after processing collected usage data in an embodiment.

FIG. 4 shows another example of a report 450 generated by the collection system 340 after processing the usage data collected from the resource planning systems 80 and 90 in an embodiment. This report shows the modules used by different entities in different systems, which may be derived from the usage data recorded by the collection system 340. This report may provide auditors and system administrators with a quick overview of which entities are using systems and modules in the organization.

Figure 5:
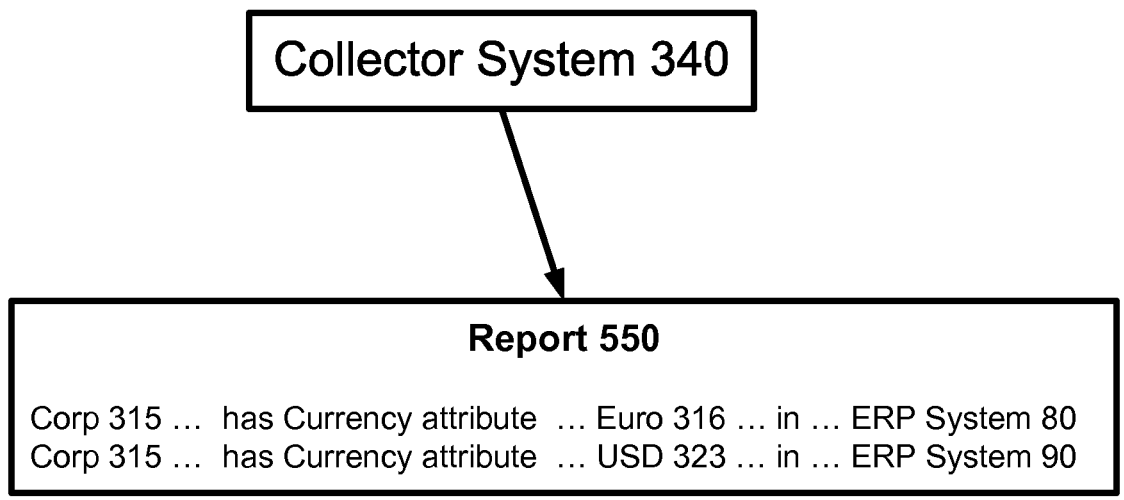
FIG. 5 shows a second exemplary report generated by the collection system after processing collected usage data in an embodiment.

FIG. 5 shows another example of a report 550 generated by the collection system 340 after processing the usage data collected from the resource planning systems 80 and 90 in an embodiment. This report shows inconsistencies, discrepancies, and/or errors between attributes in different system. This report may be generated by comparing attributes of entities in different systems to verify data consistency. A comparison of the currency, country, and region attributes for corporations 315, 322, and 326 extracted from systems 80 and 90, as shown in the bottom portion of FIG. 3, shows that corporation 315 expresses currency in Euros 316 in finance module 81 of system 80, while expressing currency in U.S. Dollars 323 in finance module 91 of system 90. This inconsistency may be an example of an event contained in report 550.

Figure 6:
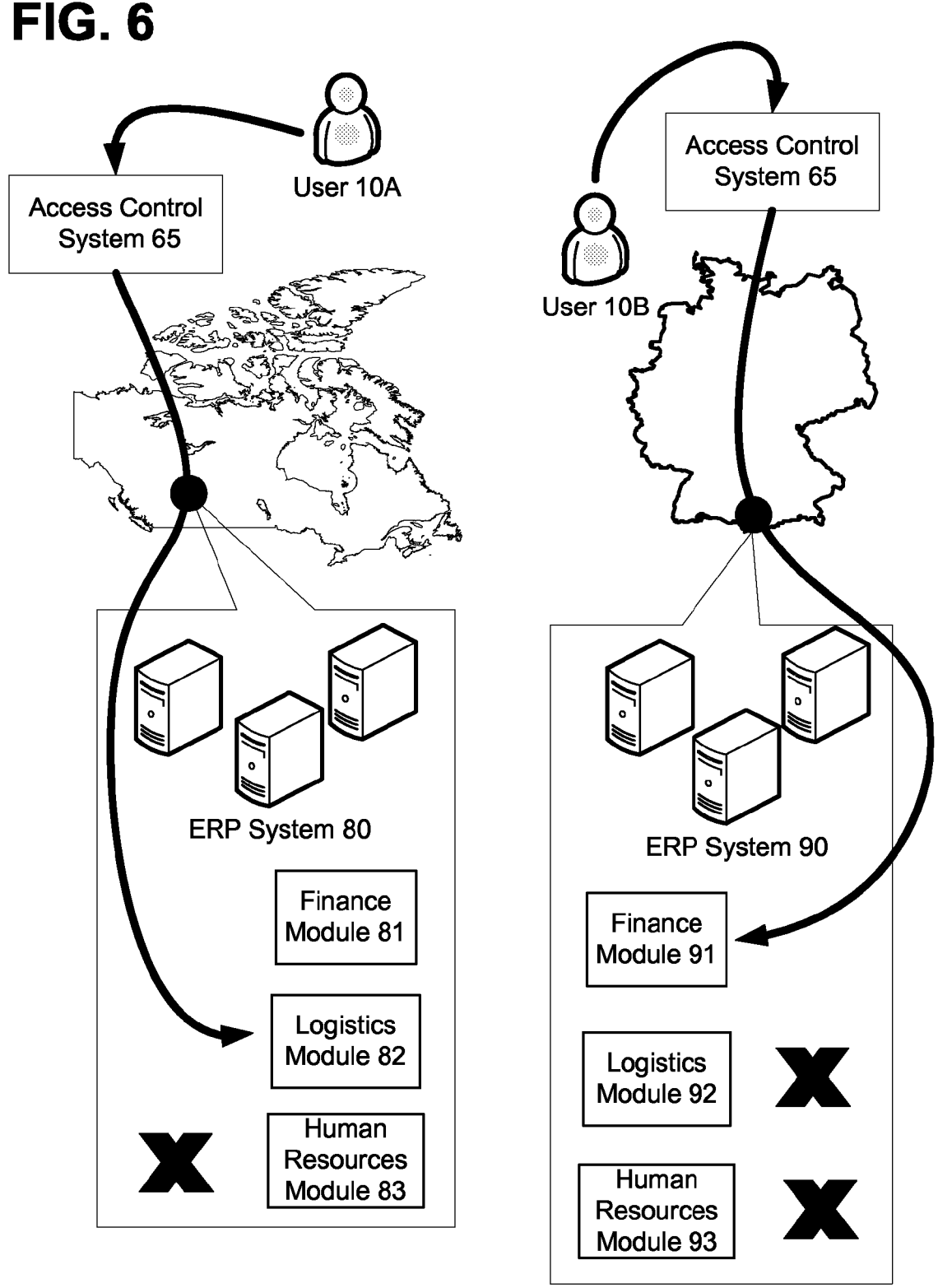
FIG. 6 shows an embodiment where the collected usage data may be used to restrict connectivity options to only authorized components and systems.

FIG. 6 shows an embodiment of the invention where the usage data collected from the resource planning systems 80 and 90 may be used to narrow a user's connectivity options to only those components and systems that the user is authorized to access through a usage switch database in an access control system 65. As discussed previously, during the usage data collection process, collector system 340 may acquire data about each modules and/or the use of each modules from each system making up the enterprise resource planning system. Thus, in an embodiment, collector system 340 may acquire data from system 80 that system 80 has three modules-finance 81, logistics 82, and human resources 93. Collector system 340 may also acquire data from system 90 that system 90 also has three modules-finance 91, logistics 92, and human resources 93.

In other embodiments, including the embodiment shown in FIG. 6, collector system 340 may acquire more detailed information about each system and module. For example, collector system 340 may extract data from system 80 indicating that: logistics module 82 is only used by one entity, in this case, user 10A, though in other cases the entity may be more broadly defined to include, for example, a group, process, corporation, or system; and human resources module 83 is not used. Similarly, collector system 340 may extract data from system 90 indicating that: finance module 91 is used by one entity, user 10B; whereas logistics module 92 and human resources module 93 are not used.

In other embodiments that only have an access control system 65 and not a collector system, information about modules and system may be entered through other means, such as manual entry or data transfers. Once the data has been acquired or entered into the access control system 65, the data may be stored in a usage switch database used by access control system 65 to focus or limit access to modules in different embodiments without having to change any data in any individual system. For example, in one embodiment, the acquired data may be used to, in effect, switch "off" unused modules, such as logistics module 92 or human resources modules 83 or 93. In an embodiment, when an unused module is "switched off" the module does not appear in a user interface and/or a user or entity is unable to establish a connection with the module.

In other embodiments, the access control system 65 may also send access control data to different systems, such as new or reconfigured systems, in the overall enterprise resource planning system to focus or limit access to modules in these systems. In some of these embodiments, the data maintained by the access control system 65 may also include a set of attributes common to all systems. The access control system 65 may then send or push these common attributes to one or more systems, including newly added or reconfigured systems, so the common attributes become attributes of these systems. In different embodiments, the common attributes may include access control attributes, non-access control attributes, or both.

In an embodiment, the acquired data may also be used to hide modules and systems from a user in a user interface that the user does not have access to. In an embodiment, the acquired data may also be used to prevent a user or entity from establishing a connection with a module or system that the entity or user does not have access to. In the embodiment shown in FIG. 6, users, such as users 10A and B, connect to access system 65 in order to determine the modules or systems that they can connect to. In an embodiment, access control system 65 may only prevent users from connecting to disabled or unused modules. In another embodiment, the access control system 65 may only allow users to connect to authorized systems and module. For example, since the user 10A is only authorized to access logisitics module 82 on system 80, logistics module 82 may be the only module that appears in a user interface for user 10A and may be the only module that user 10A may establish a connection with.

Similarly, since user 10B is only authorized to access finance module 91 on system 90, this may be the only module and/or system that user 10B would "see" in a user interface and be able to connect to through the user interface. The systems and modules that a user is able to "see" or connect to may be determined by the access control system 65 from the data obtained by the collector system 340.

Figure 7:
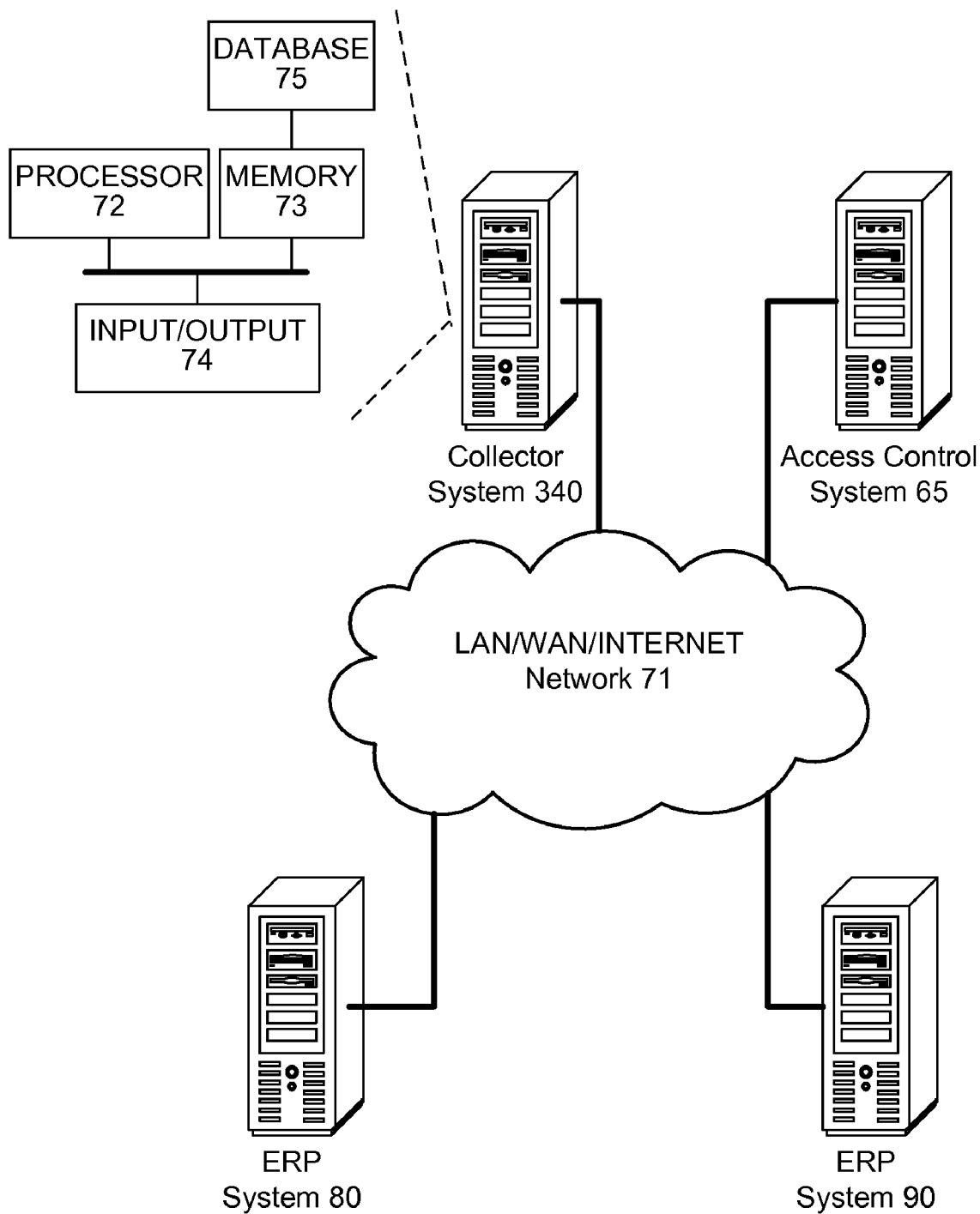
FIG. 7 shows an embodiment of an enterprise resource planning system.

FIG. 7 shows an embodiment of an enterprise resource planning system. In this embodiment, the collector system 340, access control system 65, and individual enterprise resource planning systems, such as enterprise resource planning systems 80 and 90, make up the overall enterprise resource planning system, and are all interconnected through network 71. Each of the systems in FIG. 7 may contain a processor 72, memory 73 containing a database 75, and an input/output interface 74, all of which are interconnected via a system bus. In various embodiments, the enterprise resource planning system may have an architecture with modular hardware and/or software systems that include additional and/or different systems that communicate through one or more networks. The modular design allows a business to add, exchange, and upgrade systems, including, in some embodiments using systems from different vendors. Because of the highly customized nature of enterprise resource planning systems, different embodiments may have different types, quantities, and configurations of systems depending on the environment and organizational demands.

In an embodiment, memory 73 may contain different components for retrieving, presenting, changing, and saving data. Memory 73 may include a variety of memory devices, for example, Dynamic Random Access Memory (DRAM), Static RAM (SRAM), flash memory, cache memory, and other memory devices. Additionally, for example, memory 73 and processor(s) 72 may be distributed across several different computers that collectively comprise a system.

Processor 72 may perform computation and control functions of a system and comprises a suitable central processing unit (CPU). Processor 72 may comprise a single integrated circuit, such as a microprocessor, or may comprise any suitable number of integrated circuit devices and/or circuit boards working in cooperation to accomplish the functions of a processor. Processor 72 may execute computer programs, such as object-oriented computer programs, within memory 73.

Note that while embodiments of the present invention are described in the context of a fully functional computer system, those skilled in the art will appreciate that modules of the present invention are capable of being distributed in a variety of forms across a plurality of systems. Embodiments consistent with the invention may also include one or more programs or program modules on different computing systems running separately and independently of each other, while in their entirety being capable of performing business transactions in a large enterprise environment or in a "software on demand" environment. These programs or program modules may be contained on signal bearing media that may include: recordable type media such as floppy disks and CD ROMS, and transmission type media such as digital and analog communication links, including wireless communication links.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

I claim:

1. A system comprising:
a collector system comprising a collector system database, the collector system connected to a plurality of enterprise resource planning systems through a communications network, each enterprise resource planning system comprising a module performing a different business function from other module(s) in the same system; the collector system operative to:
acquire from each enterprise resource planning system over the communications network a list of modules included in each enterprise resource planning system and a status of each module in the list;
for those modules identified as active, acquire from the respective enterprise resource planning system through the communications network a list of entities authorized to access the active modules;
record the entities authorized to access each active module in the collector system database;
link the entities recorded in the collector system database to corresponding entities included in a hierarchical organizational chart; and
record each module that is not used by the entity in a usage switch database of an access control system, the usage switch database being used by the access control system to prevent the entity from connecting to the module(s) that are not used by the entity.

2. The system of claim 1, where the usage switch database is further used by the access control system to prevent the module(s) that are not used by the entity from being displayed in a user interface.

3. The system of claim 1, where the multiple hierarchical levels include a hierarchical level superordinate to at least one of the corresponding entities included in the hierarchical organizational chart.

4. The system of claim 3, where
the organizational chart includes at least one entity authorized to access at least one module and a relationship between the at least one entity and another component of an organization.

5. The system of claim 1, the collector system further operative to:
acquire from the respective enterprise resource planning system through the communications network an attribute of at least one entity authorized to access the active modules; and
record the attribute in the collector system database.

6. A computer-implemented method of using a collector system, comprising:
connecting to a plurality of enterprise resource planning systems through a communications network, each enterprise resource planning system comprising a module performing a different business function from other module(s) in the same enterprise resource planning system;
acquiring from each enterprise resource planning system over the communications network a list of modules included in each enterprise resource planning system and a status of each module in the list;
for those modules identified as active, acquiring from the respective enterprise resource planning system through the communications network a list of entities authorized to access the active modules;
recording the entities authorized to access each active module in a collector system database;
linking the entities recorded in the collector system database to corresponding entities included in a hierarchical organizational chart; and
recording each module that is not used by the entity in a usage switch database of an access control system, the usage switch database being used by the access control system to prevent the entity from connecting to the module(s) that are not used by the entity.

7. The method of claim 6, where the usage switch database is further used to prevent the module(s) that are not used by the entity from being displayed in a user interface.

8. The method of claim 7, further comprising scanning the communications network to identify a newly configured enterprise resource planning system and sending an access control attribute to the identified newly configured system preventing the entity from connecting to the module(s) in the newly configured system that are not used by the entity.

9. The method of claim 6, where the multiple hierarchical levels include a hierarchical level superordinate to at least one of the corresponding entities included in the hierarchical organizational chart.

10. The method of claim 6, where:
the organizational chart includes at least one entity authorized to access at least one module and a relationship between the at least one entity and another component of an organization.

11. The method of claim 6, further comprising:
acquiring from the respective enterprise resource planning system through the communications network an attribute of at least one entity authorized to access the active modules; and
recording the attribute in the collector system database.

12. An article of manufacture containing a computer-readable medium storing program instructions that, when executed by a processor, cause the processor to perform actions comprising:
connecting to a plurality of enterprise resource planning systems through a communications network, each enterprise resource planning system comprising a module performing a different business function from other module(s) in the same enterprise resource planning system;

acquiring from each enterprise resource planning system over the communications network a list of modules included in each enterprise resource planning system and a status of each module in the list;

for those modules identified as active, acquiring from the respective enterprise resource planning system through the communications network a list of entities authorized to access the active modules;

recording the entities authorized to access each active module in a collector system database;

linking the entities recorded in the collector system database to corresponding entities included in a hierarchical organizational chart; and recording each module that is not used by the entity in a usage switch database of an access control system, the usage switch database being used by the access control system to prevent the entity from connecting to the module(s) that are not used by the entity.

13. The article of claim 12, where the usage switch database is further used to prevent the module(s) that are not used by the entity from being displayed in a user interface.

14. The article of claim 12, where the multiple hierarchical levels include a hierarchical level superordinate to at least one of the corresponding entities included in the hierarchical organizational chart.

15. The article of claim 12, where:
the organizational chart includes at least one entity authorized to access at least one module and a relationship between the at least one entity and another component of an organization.

16. The article of claim 12, containing further instructions that, when executed by a processor, cause the processor to perform further actions comprising:

acquiring from the respective enterprise resource planning system through the communications network an attribute of at least one entity authorized to access the active modules;

recording the attribute in the collector system database.

17. A system comprising:

an access control system in an enterprise resource planning system, the access control system comprising an access control database, the access control database storing a set of attributes, the access control system operative to:

acquire from each of a plurality of enterprise resource planning systems over a communications network a list of modules included in each enterprise resource planning system and a status of each module in the list;

for those modules identified as active, acquire from the respective enterprise resource planning system through the communications network a list of entities authorized to access the active modules;

record the entities authorized to access each active module in the access control database;

record each module that is not used by the entity in a usage switch database of an access control system, the usage switch database being used by the access control system to prevent the entity from connecting to the module(s) that are not used by the entity; and restrict entity access to only those active modules recorded in the access control database without changing any data in the enterprise resource planning systems.

* * * * *